United States Patent Office 3,032,297
Patented May 1, 1962

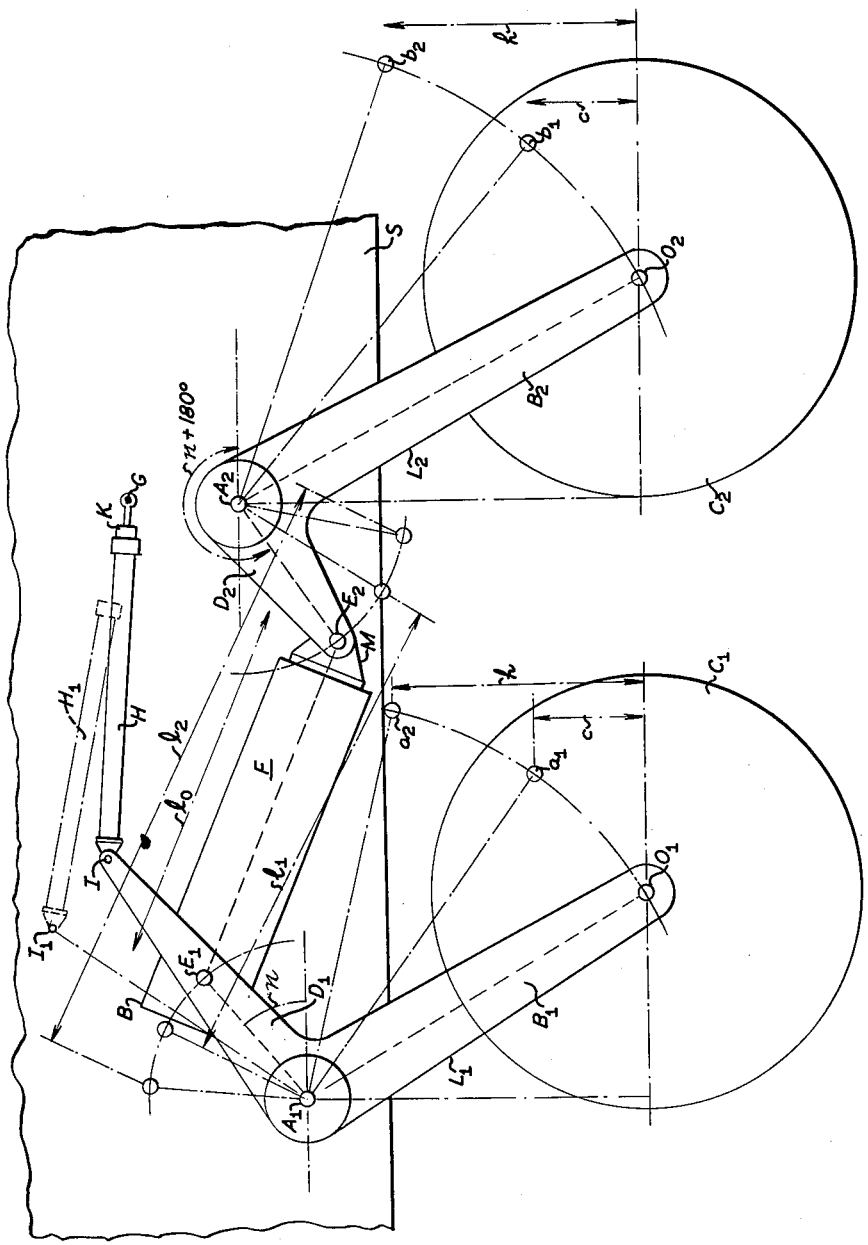

3,032,297
AIRCRAFT LANDING GEAR WITH
TANDEM WHEELS
René Lucien, Neuilly-sur-Seine, France, assignor to Societe a Responsabilite Limitee Recherches Etudes Production R.E.P., Paris, France, a corporation of France
Filed May 14, 1959, Ser. No. 813,153
Claims priority, application France June 6, 1958
5 Claims. (Cl. 244—102)

This invention relates to aircraft landing gear with tandem wheels.

The increasingly heavy loads carried by modern aircraft make it necessary to provide such aircraft with undercarriages having multiple wheels coupled in tandem, each element of this tandem being capable of comprising a single wheel or a pair of wheels rotating about a single shaft.

The present invention has for an object the provision of an improved landing gear of the tandem-wheel type.

A landing gear provided in accordance with the invention is characterized in that it comprises two elbowed levers placed one behind the other, each lever being pivotally mounted on the aircraft, one arm of each lever carrying one of the wheels or a pair of coaxial wheels, while the two other arms are coupled together by means of a telescopic shock absorber, the body of which is pivotally mounted on one of the arms and the piston rod of which is pivotally mounted on the other arm.

In accordance with a further feature of the landing gear, the levers are each arranged with respect to each other in such a manner that the reactions of contact between the wheels and the ground on the shock absorber determine the extension setting of this latter.

Further features of the invention will appear in the course of the description which follows with respect to one embodiment of the invention. The invention is illustrated by the sole figure of the accompanying drawing which shows a diagrammatic side view of the landing gear.

The landing gear comprises two elbowed levers $L_1$, $L_2$ pivotally mounted respectively at $A_1$ and $A_2$ on the structures of the aircraft. The two arms $B_1$, $B_2$ which are substantially parallel constitute the wheel carrying legs at the extremities of which are mounted the wheels (or pair of wheels) $C_1$, $C_2$ rotating respectively about the axes $O_1$, $O_2$. The two other lever arms $D_1$, $D_2$ are oppositely directed with respect to each other and are parallel and coupled to each other by means of a telescopic shock absorber F, the arm $D_1$ for example being pivotally mounted on the body B of the shock absorber and the arm $D_2$ being pivotally mounted on the extremity of the piston or extensible element M of the shock absorber. Arms $D_1$ and $D_2$ respectively define angles of $n°$ and $n+180°$ relative, for example, to the horizontal. The drawing shows in full lines the landing gear in its bottom position, the aircraft being on the ground. It may be seen that in this position the shock absorber is retracted. The distance between the pivotal points $E_1$, $E_2$ is then $l_0$. In order to prevent the wheels from swinging when the aircraft has left the ground and to keep them at a constant distance, a fixed point G of the aircraft is coupled by means of an elastic coupling H to a point I of the lever $D_1$, this elastic coupling acting by traction on the lever arm $D_1$. This coupling, by means of its stop at K, imposes a fixed position on the point I, therefore on the lever $L_1$ and subsequently on the lever $L_2$ as long as the shock absorber F remains in its retracted position. In other words, elastic coupling H imparts to said arms a given position when the aircraft has left the ground.

As a result of impact on the ground which would for example bring the axes of the two wheels respectively to positions $a_1$ and $b_1$ at a distance $c$ from the line $O_1$, $O_2$, the shock absorber will be brought to extended position with a length $l_1$, the elastic coupling being lengthened to take up the position $H_1$. The maximum extension $l_2$ of the shock absorber, bringing the axes of the wheels to $a_2$, $b_2$, at a distance $h$ from the line $O_1$, $O_2$, corresponds to the retracted position of the landing gear.

What I claim is:

1. Apparatus for an aircraft having tandem wheels retractable by means of a device provided for this purpose and said device also serving as a shock absorber and including an extensible portion and a body operatively associated with said body portion, comprising two levers, each comprising an elbow, both levers being mounted pivotably on the aircraft about parallel axes passing through the respective elbows, said axes being located one behind the other and at the same level, and said levers having wheel-supporting arms having said wheels mounted thereon and arms articulated about axes parallel to said lever axes respectively to the body and to the extensible portion of said device, said last arms being directed in such a manner that, if one arm forms an angle equal to $n$ with the wheel-carrying arm which is adjacent to it, the other arm forms with the wheel-carrying arm which is adjacent to it an angle equal to $n+180°$.

2. Apparatus according to claim 1, wherein the spacing of the pivoting axes of the levers and of the axes of articulation of the shock absorber are such that, in a position of the wheels appropriate for landing, the arms are parallel and the shock absorber is in completely retracted position.

3. Apparatus according to claim 2, wherein the shock-absorbing device is provided so that, being completely extended, the wheel-carrying arms arrive at a level sufficiently close to that of the pivoting axes of the levers so that the retracted apparatus is entirely in the body of the aircraft.

4. Apparatus according to claim 3 comprising a resilient coupling between the aircraft and said arms so as to create a force urging said arm toward the position which is appropriate for landing.

5. Apparatus according to claim 4, wherein the resilient coupling serves as a stop operatively associated with said arm in order to avoid oscillations of the apparatus about the pivoting axes of the elbow levers and to immobilize it in the landing position when the shock absorber is entirely retracted.

References Cited in the file of this patent

UNITED STATES PATENTS

| 1,600,154 | Van Vliet | Sept. 14, 1926 |
| 2,130,914 | Warren | Sept. 20, 1938 |
| 2,386,620 | Loyd | Oct. 9, 1945 |

FOREIGN PATENTS

| 1,037,210 | France | Apr. 29, 1953 |